United States Patent [19]
Breton

[11] 3,884,137
[45] May 20, 1975

[54] KERNEL FRUIT SHELLING MACHINE

[76] Inventor: Lucien Breton, Route de Chalais, 16300 Barbezieux, France

[22] Filed: Dec. 6, 1973

[21] Appl. No.: 422,541

[30] Foreign Application Priority Data
Dec. 14, 1972 France .............................. 72.44510

[52] U.S. Cl. .................. 99/625; 100/153; 198/195
[51] Int. Cl. ............................................. A23n 5/10
[58] Field of Search ............ 99/568, 575, 577, 579, 99/623–625, 616, 628; 241/200; 100/153; 51/140; 198/165, 167

[56] References Cited
UNITED STATES PATENTS
| | | | |
|---|---|---|---|
| 1,350,506 | 8/1920 | Kennedy | 99/625 |
| 3,745,913 | 7/1973 | Hobbs | 99/625 |

Primary Examiner—Harvey C. Hornsby
Assistant Examiner—Robert T. Pous
Attorney, Agent, or Firm—Edward F. Levy

[57] ABSTRACT

In this machine for shelling kernel fruits, of the type comprising two spaced endless belts driven at different speeds, between which the kernel fruits are caused to travel to be shelled by a frictional action, a first one of said endless belts having its operative run supported by rollers so disposed as to guide the operative run of said first endless belt along a substantially rectinilear path, the other endless belt having its operative run guided by rollers so arranged as to cause the operative run of said second belt to follow a sinuous path moving by turns towards and away from said rectilinear path, the points of said sinuous path which are nearest to said rectilinear path, being each time substantially equally spaced from the points where two adjacent rollers support said first belt. This machine is particularly but not exclusively intended for shelling chestnuts.

9 Claims, 6 Drawing Figures

KERNEL FRUIT SHELLING MACHINE

FIELD OF THE INVENTION

The present invention relates to a machine for shelling or skinning kernel fruits, or the type comprising a pair of endless belts having operative runs spaced from each other and driven at different linear speeds and between which the kernal fruits are caused to travel in order to shell them by frictional contact with the belt surfaces, after the skins or shells of these fruits have been subjected to a suitable preliminary treatment, a first one of said belts being supported along its operative run by a first set of spaced rollers having parallel axes disposed substantially in a common plane so as to guide the operative run of said first belt along a substantially rectilinear path, the second belt being guided along its operative run by a second set of spaced rollers having their axes parallel to each other and to those of the first set of rollers.

In the following disclosure, the term "kernel fruits" is used for designating fruits such as hazel-nuts, almonds, chestnuts or other similar fruits.

BACKGROUND OF THE INVENTION

A machine of the type broadly described hereinabove, intended more particularly for blanching almonds, is already known, notably through the French Pat. No. 596,916.

Although a known machine of this type is satisfactory for blanching almonds, it is nearly useless for peeling or shelling chestnuts, notably in view of preparing iced chestnuts. In fact, in the preparation of iced chestnuts it endeavoured, more particularly for reasons of appearance of the finished product, to avoid crushing the chestnuts and to preserve as much as possible their natural appearance as obtained after removal of the inner skin thereof. It is therefore essential to meet this requirement during the shelling or peeling operation. Now, when the above-described known machine is used for shelling chestnuts, it is observed that many chestnuts are crushed irremediably. This is due to the fact that chestnuts vary in size considerably more than almonds (this variation attaining or exceeding ⅜ inch). Therefore, the chestnuts must be sorted beforehand according to their size ranges and the relative spacing of the two endless belts must be set according to each specific size range to be treated in the pinching area thereof. Of course, this sorting operation involves the use of additional apparatus and, due to the adjustment steps necessary for each chestnut size, a loss of time. Moreover, even if the relative spacing of the two operative runs of the pair of belts is adjusted each time as a function of the chestnut size to be treated, it is nevertheless observed that a still considerable proportion of chestnuts are crushed and therefore useless for the preparation of iced chestnuts. It might be inferred that this is due to the non-spherical shape of chestnuts, so that even properly sorted chestnuts may offer substantial variations in size according to the position in which they engage the gap formed between the two belts. Now if the relative spacing of the operative belt runs is increased in order to cope with this difficulty, a relatively large number of chestnuts is most likely to remain untreated and escape the shelling operation. Moreover, as mentioned in the aforesaid French patent, almonds are treated by exerting an abrasive action thereon. Now this action is not applicable to chestnuts to be shelled for preparing iced chestnuts. In fact, this abrasive action is attended not only by a loss of expensive consumable product but also by the fact that it deprives the shelled chestnuts of their surface layer, and also of part of their flesh, a consequence to be avoided as much as possible both for the above-mentioned natural appearance requirement and to avoid losses of expensive product. Finally, due to the constant relative spacing of the belt runs, the chestnuts having a flat face are scarcely liable to turn over when they rest with their flat face on the lower belt, so that these chestnuts are not fully shelled when they emerge from the machine.

From the foregoing it is therefore clear that the known machine broadly described hereinabove, although suitable for blanching almonds, is not suited for shelling and skinning chestnuts.

SUMMARY OF THE INVENTION

It is the essential object of the present invention to avoid the inconveniences set forth hereinabove by providing an improved machine of the type broadly described in the foregoing, this improved machine being designed for shelling more particularly but not exclusively chestnuts, without requiring any preliminary sorting or grading thereof, and without any risk of crushing them.

To this end, the machine according to this invention for shelling chestnuts and other kernel fruits is characterized in that the rollers of the second set are so arranged as to cause the operative run of the second endless belt to follow a sinuous path by turns towards and away from the rectilinear path followed by the operative run of the first endless belt, and in that points of the sinuous path of said second belt which are nearest to the rectilinear path of said first belt are each time substantially equally spaced from points where two adjacent rollers of the first set support said first belt.

With this particular arrangement, since these rollers of the second set which determine the points of said second belt nearest to the rectilinear path of the first belt are offset in the longitudinal direction of said rectilinear path with respect to the rollers of the first set, the first endless belt is not rigidly supported at points of the rectilinear path thereof underlying said rollers of the second set of rollers which determine said nearest points, whereby each time a chestnut is engaged into one of the successive friction areas formed between the first belt and each one of said nearest points of the sinuous path of the second belt, the first belt, due to its inherent flexibility, can be deflected away from the second belt. Consequently, by properly adjusting the tightness of the first belt, it is possible to prevent the chestnuts from being crushed in said friction areas. Moreover, since only one of the belts is rigidly guided in these friction areas, any abrasive action of these belts is substantially precluded, at the benefit of a surface action tending to peel the chestnuts without damaging their flesh.

In order more positively to prevent the chestnuts from being crushed in the friction area, it is also possible, according to a typical embodiment of this invention, to resiliently support the rollers of the first set or those rollers of the second set which determine the points of the sinuous path which are nearest to the rectilinear path of the first belt, so that said rollers can yield in case an abnormally high pressure were exerted by the kernel fruits against the first belt or the second belt, respectively, in said friction areas.

Moreover, due to the above-arrangement, successive and substantially triangular gaps are provided between the two belts which, alternate with said friction areas, whereby the chestnuts have ample liberty to turn over due to the rotary torque applied thereto as a consequence of the differential velocity developing between the two belts, so that the chestnuts are peeled completely on all their faces.

With the machine according to the present invention, it is possible to shell chestnuts of same size range without crushing them, but it is also possible to shell chestnuts of different size ranges without having to perform a preliminary sorting or grading operation, or setting each time the machine as a function of the chestnut size.

Other objects, features and advantages of this invention will appear more clearly as the following description proceed with reference to the attached drawings illustrating diagrammatically a preferred embodiment of the invention. In the drawings:

DESCRIPTION OF THE PREFERRED EMBODIMENT

Figure 1:
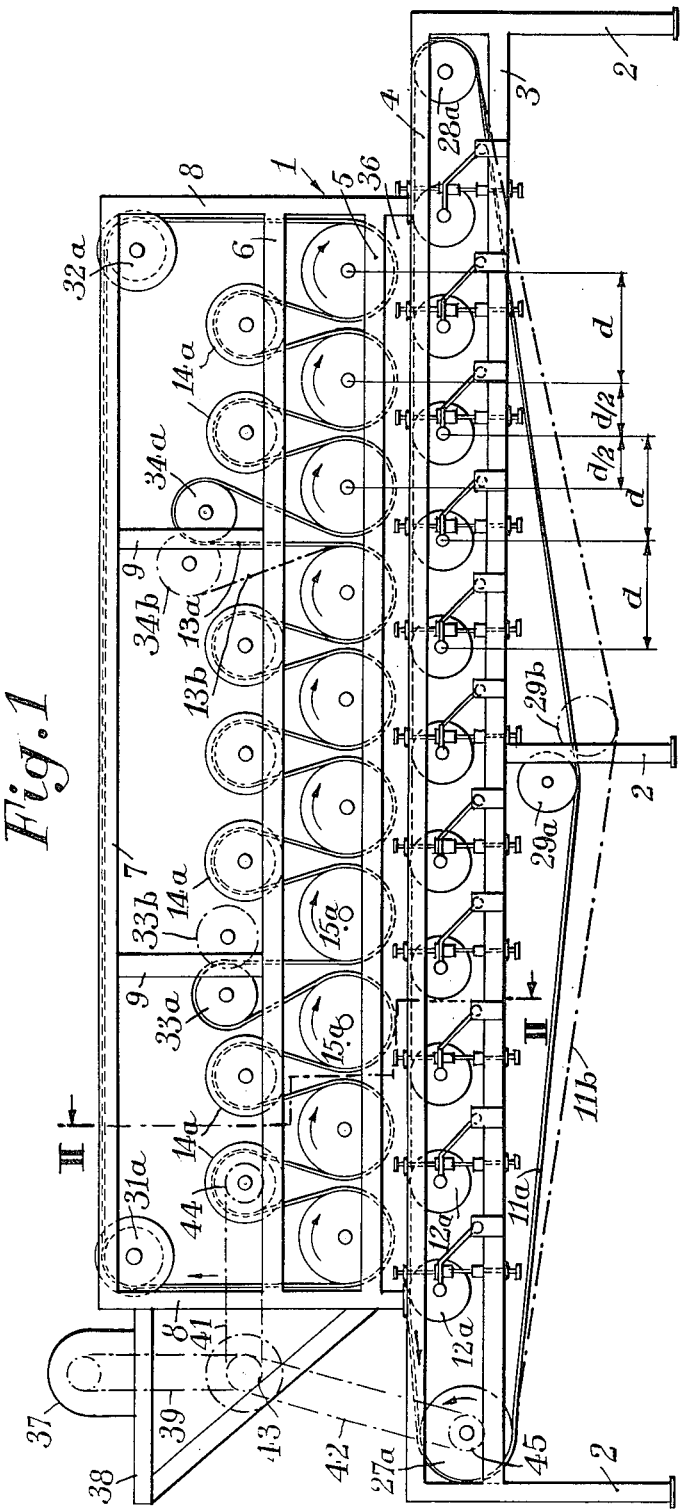
FIG. 1 is a diagrammatic side elevational view of an improved chestnut shelling machine constructed according to the teaching of this invention.
Figure 2:
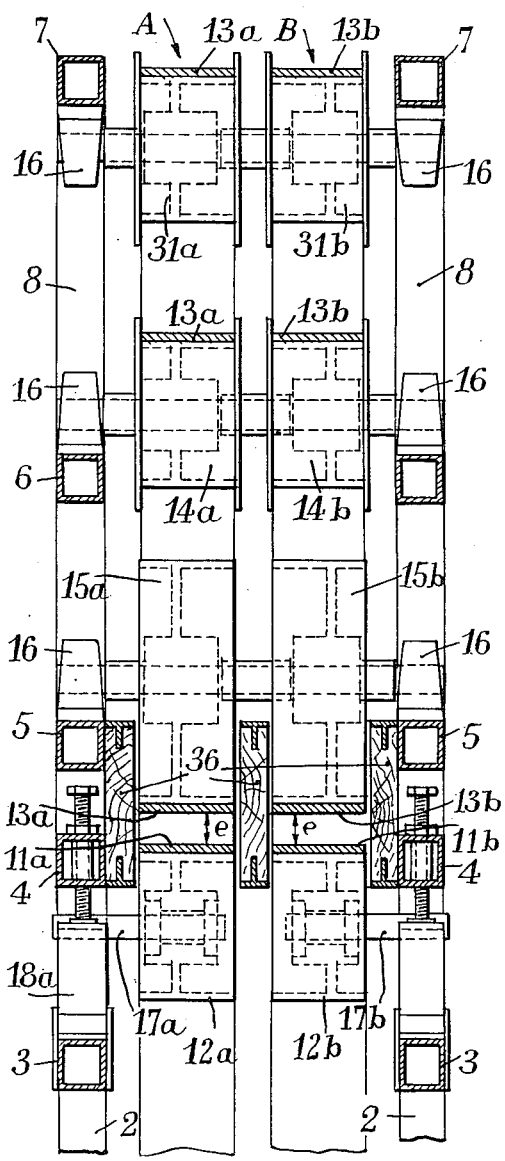
FIG. 2 is a section taken on a larger scale along line II—II of FIG. 1.

The machine illustrated in FIGS. 1 and 2 comprises a frame structure 1 consisting of a plurality of legs 2, longitudinal beams 3, 4, 5, 6 and 7 interconnected by said legs 2, by uprights 8, by bracing members 9, and also by horizontal cross members (not shown). Protection plates (not shown) may be fastened to the longitudinal beams, along the sides of the machine, for concealing, both for aesthetics sake and for safety's sake, the various movable members mounting in said frame structure and to be described in detail hereinafter.

The frame structure 1 carries two chestnut shelling assemblies or units A and B, as shown more particularly in FIG. 2. Since these assemblies or units A and B are identical, only assembly A will be described in detail, the reference numerals designating the component elements of this assembly bearing the index letter $a$, those of the other assembly B bearing the index letter $b$.

This assembly A comprises essentially a first endless belt 11a supported along its operative run by a first set of rollers 12a, and a second endless belt 13a guided along its operative run by another set of rollers 14a and 15a.

As shown more in detail in FIG. 1, the shafts of rollers 12a, which are resiliently supported as will be explained presently, are parallel to each other and lie substantially in a same horizontal plane, so that these rollers 12a will guide the operative run of belt 11a along a substantially rectilinear path. On the other hand, the shafts of rollers 14a and 15a, which are supported at their ends by pairs of bearings 16 (not shown in FIG. 1) secured to the longitudinal beams 5 and 6, are parallel to one another and to the shafts of rollers 12a, but the rollers 14a and 15a are so disposed that the lower or operative run of the associated endless belt 13a is caused to follow a sinuous path moving by turns towards and away from the rectilinear path followed by the upper operative run of the first belt 12a. Furthermore, as clearly apparent from FIG. 1, the respective positions of the shafts of rollers 12a and rollers 15a are such that the centre of each roller 15a (as seen in FIG. 1) is substantially equidistant from the centres of two adjacent rollers 12a, whereby the points of the sinuous path followed by the operative run of endless belt 13a which are nearest to the rectilinear path followed by the operative run of belt 11a are each time substantially equally spaced from the points where two adjacent rollers 12a support the first belt 11a. With this arrangement, and due to the fact that the two endless belts are driven at different speeds, as will be explained presently, a chestnut-engaging friction area is formed between the two belts under each one of the points of said sinuous path which are nearest to the rectilinear path of the lower belt 11a, and each friction area thus formed is located between two adjacent rollers 12a and is equally spaced from the points where these two rollers support the belt 11a so that this belt 11a, due to its inherent flexibility, can easily yield away from the opposite belt 13a and thus prevent the chestnuts travelling in said friction area from being crushed.

Figure 3:
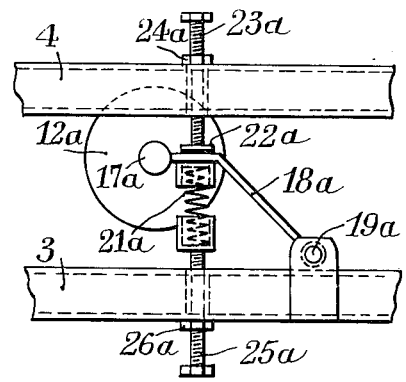
FIG. 3 is a fragmentary view showing a detail on a larger scale.

Moreover, in order positively to prevent the chestnuts from being crushed to said friction areas, it may be advantageous to resiliently mount the rollers 12a or 15a. In the embodiment shown by way of example in the drawings the resiliently supported rollers are the lower belt rollers 12a. The means provided therefor will now be described with particular reference to FIGS. 2 and 3. Each roller 12a is mounted free for rotation on a shaft 17a and the latter is rigidly secured at one end to one end of an arm 18a having its other end pivoted to the longitudinal beam 3 by means of a pivot pin 19a parallel to the shaft 17a. A spring 21a constantly urges the arm 18a towards a stop member 22a formed at the end of a screw 23a threadedly engaging a tapped socket rigid with longitudinal beam 4 so that, with the assistance of a lock nut 24a, the position of said stop 22a can be adjusted as required. The compressive force of spring 21a may be adjusted by means of another screw 25a provided with a lock nut 26a and threadedly engaging a tapped socket rigid with longitudinal beam 3. With this arrangement and with the arm 18a normally engaging the stop member 22a, when the chestnuts passing through the friction areas exert on the lower belt 11a a pressure exceeding a predetermined adjustable valve, this pressure is transmitted to the rollers 12a and these are thus pushed downwards against the action of springs 21a, so that chestnuts of different sizes can be shelled safely, without having to reset the machine each time, since the relative spacing between the belts 11a and 13a is adjusted automatically as the chestnuts pass through each friction area. Moreover, when the machine is not in operation, the minimum gap $e$ (FIG. 2) between these belts 11a and 13a in each friction area can be adjusted by means of the adjustable stop member 22a. Thus, for instance, for shelling chestnuts, the position of stop member 22a is so adjusted that the gap $e$ between the belts in each friction area is the order of 8 to 10 mm.

Referring again to FIG. 1, it will be seen that the distance between the centres of the shafts $d$ of any pair of adjacent rollers $15a$ is slightly greater than the diameter of one of these rollers $15a$ plus twice the thickness of belt $15a$. This arrangement is advantageous in that it is effective for preventing the chesnut skins previously removed in the friction areas from penetrating into the loops formed by the upper belt $13a$ as it passes over the flanged rollers or pulleys $14a$, which otherwise might become foul. In addition, in order to increase the friction surface area of the upper belt $13a$ in each friction area as defined hereinabove, the rollers $15a$ should desiredly have a relatively large diameter but, on the other hand, in order to avoid any risk of crushing the chestnuts between rollers $12a$ and $15a$ the peripheral surface area of rollers $15a$ should desiredly be as remote as possible from that of rollers $12a$. Therefore, the rollers $12a$ should preferably have a smaller diameter than rollers $15a$, for example in the proportion of two-thirds or less than this value.

Figure 4:
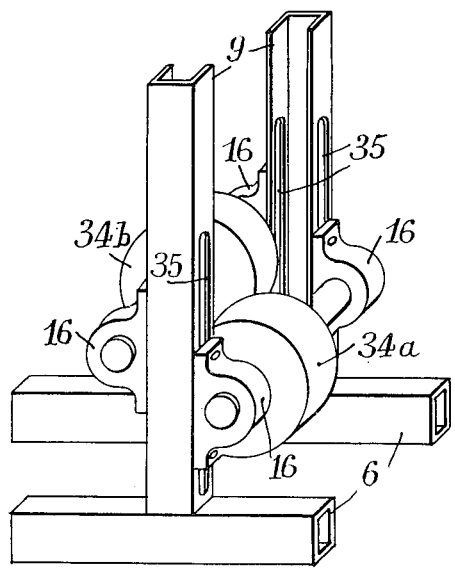
FIG. 4 is a fragmentary view showing also on a larger scale and in perspective another detail.

In addition to the set of rollers $12a$, the machine comprises two return pulleys $27a$ and $28a$ and a stretcher-pulley $29a$ associated with the lower endless belt $11a$. Similarly, the upper endless belt $13a$ is guided by a pair of return pulleys $31a$, $32a$ and by a pair of stretcher-pulleys $33a$, $34a$. The shafts of pulleys $27a$, $28a$, $31a$ and $32a$ are rotatably mounted in bearings (not shown in FIG. 1) which may be similar to the bearings 16 illustrated in FIG. 2 as supporting the pulley $31a$, said pulley bearings being secured to the longitudinal beams 3, 4 and 7, respectively. Similarly, the shafts of the stretcher-pulleys $29a$, $33a$ and $34a$ are rotatably mounted in bearings 16 of which the position is adjustable along the legs 2 or uprights 9 as may be the case to permit a proper adjustment of the tension of the belt $11a$ or $13a$ associated therewith. FIG. 4 illustrates a typical embodiment of the means contemplated for adjusting the position of said bearings 16 along the uprights 9, for example in the specific case of the stretcher-pulley $34a$ of assembly A and stretcher pulley $34b$ of assembly B. As illustrated in this FIG. 4, the uprights 9 consist of U-section members having longitudinal slots 35 formed through their side wings, the bearings 16 being blocked in the selected position by means of bolts (not shown) passing through said slots 35.

As clearly apparent from FIG. 2, each pair of pulleys $14a$, $14b$ is mounted on a common shaft. The same applies to each pair of pulleys $15a$, $15b$ and to each pair of pulleys $31a$, $31b$. On the other hand, each roller $12a$ of assembly A is rotatably mounted on a shaft $17a$ separate from the shaft $17b$ carrying each pulley $12b$ of assembly B. Besides, side walls 36 secured to the longitudinal beams 4 and 5 are provided on either side of rollers $12a$ and $15a$ of assembly A, and on either side of rollers $12b$ and $15b$ of assembly B, for preventing the chestnuts from escaping laterally.

Figure 5B:
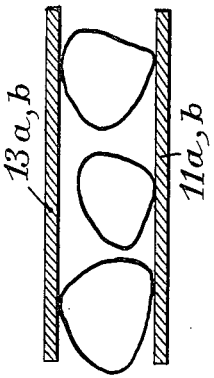
FIGS. 5a and 5b are diagrammatic fragmentary views illustrating the mode of operation of the machine.
Figure 5A:
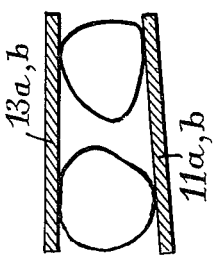

From the foregoing one might wonder why two assemblies are provided instead of one with rollers and endless belts having twice the width of the rollers and belts of each assembly. The reason will apear clearly if reference is made to FIGS. $5a$ and $5b$. In fact, as shown in FIG. $5a$, it can be easily understood that, when two chestnuts of different size engage simultaneously a same friction area under a roller $15a$ or $15b$, the belt $11a$ or $11b$ will be allowed to assume the position shown in FIG. $5a$, since it is not rigidly supported in this friction area, so that the friction actions produced by the pair of belts $11a$ (or $11b$) and $13a$ (or $13b$) can be exerted on both chestnuts simultaneously. On the contrary, as shown in FIG. $5b$, if the belts have such a width that three or more chestnuts can engage simultaneously a same friction area, and if the two outermost chestnuts (FIG. 5) are larger than the intermediate chestnut, it is clear that no friction action can be exerted on this intermediate chestnut. Therefore, it is most preferable that the belts have a relatively reduced width so that only two chestnuts can simultaneously engage a same friction area. In actual practice, the belt width may range from about 50 to about 120 millimeters.

Finally, to complete the above-described machine, a motor 37 supported by a bracket 38 secured to the frame structure 1 is provided. Suitable transmission means, such as for instance endless belts or chains 39, 41 and 42, and pulleys or toothed wheels 43, 44 and 45, together with a speed varying mechanism (not shown) of any known design, are provided for driving the endless belts $11a$ and $13a$ or assembly A and the belts $11b$ and $13b$ of assembly B at suitable linear speeds. As shown by the arrows in FIG. 1, the belts $11a$, $11b$ and $13a$, $13b$ are so driven that in each friction area the respective linear speed vectors of these belts have the same direction. Moreover, in order to produce an efficient friction action, the speed of one belt of any assembly A or B is preferably relatively higher than the speed of the other belt of the same assembly. In order to ensure a predetermined chestnut flow or output while avoiding any risk of choking the machine due to an undesired chestnut accumulation, the higher linear velocity should be imparted to the upper endless belt $13a$, $13b$ rather than to the lower belts $11a$, $11b$. Furthermore, it was found in actual practice that to obtain a satisfactory chestnut shelling action the velocity of the upper belts $13a$ and $13b$ should be at least 1.33 times that of the lower belts $11a$, $11b$.

The above-described machine operates as follows: the chestnuts issuing from a preliminary treatment (for instance forming a cut through their skin and/or a preliminary surface roasting treatment are fed onto the endless belts $11a$ or $11b$ at one end of the machine, for example the right-hand end as seen in FIG. 1, through a suitable loading funnel (not shown). The belts $11a$ and $11b$ then act as a conveyor and direct the chestnuts under the successive rollers $15a$ and $15b$ so that, due to the higher linear speed of belts $13a$ and $13b$, a friction force is applied to these chestnuts to remove at least a part of their skin each time they pass through a friction area. In order to increase this friction action, at least one of the opposing surfaces of belts $11a$ and $13a$, or $11b$, and $13b$, has formed therein suitable patterns of the like, or is coated with a suitable material capable of imparting a slight roughness thereto. However, care should be taken not to use belts having too rough surfaces in order not to abrade the surface layer of the flesh of the chestnuts, but rather to detach or separate the skin from the flesh. When the chestnuts emerge from the opposite end of the machine, for example the left-hand end as seen in FIG. 1, their skin has been removed and they can be collected in a vessel or pan, and directed to a subsequent treatment station. Practical tests proved that, in a machine constructed according to the teachings of the invention, it was possible to shell a larger number of chestnuts per time unit than with hitherto known machines, this result being obtained with extremely low losses (crushed chestnuts) and without having to preset the machine for each chestnut size.

Although the machine described hereinabove with reference to the attached drawings is intended more particularly for shelling chestnuts, it will be appreciated by those conversant with the art that it can also be used for shelling or skinning other kernel fruits such as hazelnuts, almonds and the like. In this case, the only change required consists in properly setting the relative spacing e by means of screws 23a or 23b and nuts 24a or 24b.

Of course, the specific embodiment illustrated and described herein is given by way of illustration, not of limitation; therefore, many modifications and changes, as will readily occur to those conversant with the art, may be brought thereto without departing from the basic principles of the invention as set forth in the appended claims. Thus, notably, the number of rollers 12 and 15, respectively, may be smaller or greater than the number illustrated in the drawings. On the other hand, an efficient machine may also be constructed along the lines set forth hereinabove by using only one assembly A or B, or more than two such assemblies.

What I claim is:

1. A machine for shelling kernel fruits, which comprises a pair of endless belts driven at different linear speads and providing between operative runs thereof a space through which the kernel fruits to be shelled are caused to travel in order to shell them by frictional action after a preliminary suitable treatment has been applied to their skin or hull, a first set of rollers having parallel axes, which are spaced from each other and disposed substantially in the same horizontal plane in order to guide the operative run of the first belt along a substantially rectilinear horizontal path bounding the lower side of said space, and a second set of rollers having parallel axes also parallel to the axes of the rollers of said first set, wherein the rollers of said second set are so disposed as to cause the operative run of said second belt to follow a sinuous path bounding the upper side of said space and to move by turns towards and away from said rectilinear path, said sinuous path of the operative run of said second belt having points which are nearest to said rectilinear path of said first belt to provide respective friction areas through which said kernel fruits pass and are engaged by both belts, each of said friction areas being transversely spaced substantially equally between points where two adjacent rollers of said first set support said first belt, said belts providing substantially triangular gaps between said friction areas of a size to permit said kernel fruits to overturn on said first belt.

2. Machine as set forth in claim 1, wherein the rollers of said first set are resiliently supported so that they can yield under a pressure exceeding a predetermined pressure exerted by the treated kernel fruits against said first belt.

3. Machine as set forth in claim 1, wherein both belts travel in the same direction along said sinuous path and said rectilinear path, and the linear speed of said second belt is higher than that of said first belt.

4. Machine as set forth in claim 3, wherein the linear speed of said second belt is at least 1.33 times that of said first belt.

5. Machine as set forth in claim 1, wherein the width of said first and second belts lies within the range of about 50 to about 120 millimeters.

6. Machine as set forth in claim 1, wherein the distance between centers of any pair of adjacent rollers of said second set which determine the points of said sinuous path which are nearest to said rectilinear path is slightly greater than the diameter of the rollers of said second set, and the diameter of the rollers of said first set is smaller than that of the rollers of said second set.

7. Machine as set forth in claim 6, wherein the diameter of the rollers of said first set is at the most equal to the two-thirds of the diameter of the rollers of said second set.

8. Machine as set forth in claim 1, wherein at least one of the opposing surfaces of said first and second belts is slightly rough.

9. Machine as set forth in claim 1, which comprises a plurality of shelling assemblies disposed side by side and comprising each a pair of endless belts and two sets of rollers associated with said endless belts, respectively.

* * * * *